(12) United States Patent
Breed

(10) Patent No.: US 12,516,769 B1
(45) Date of Patent: Jan. 6, 2026

(54) MOBILE OVERHEAD MONITOR BRACKET STAND

(71) Applicant: Clifford B. Breed, Fort Worth, TX (US)

(72) Inventor: Clifford B. Breed, Fort Worth, TX (US)

( * ) Notice: Subject to any disclaimer, the term of this patent is extended or adjusted under 35 U.S.C. 154(b) by 0 days.

(21) Appl. No.: 18/137,411

(22) Filed: Apr. 20, 2023

(51) Int. Cl.
  *F16M 11/20* (2006.01)
  *F16M 11/24* (2006.01)
  *F16M 11/42* (2006.01)

(52) U.S. Cl.
  CPC ......... *F16M 11/2014* (2013.01); *F16M 11/24* (2013.01); *F16M 11/42* (2013.01)

(58) Field of Classification Search
  CPC ........ F16M 11/42; F16M 11/26; F16M 11/28; F16M 11/046; F16M 11/24; F16M 11/2014; F16M 11/2085; F16M 11/2092; F16M 11/045; F16M 11/048; F16M 11/425; A47B 23/007
  USPC .............................................. 248/445, 176.1
  See application file for complete search history.

(56) References Cited

U.S. PATENT DOCUMENTS

| | | | | |
|---|---|---|---|---|
| 1,692,337 A | * | 11/1928 | Forbes .................. | A47B 23/007 248/447.2 |
| 3,889,910 A | * | 6/1975 | Walters ................ | A61G 7/0533 248/921 |
| D270,689 S | * | 9/1983 | Boscacci ........................ | D6/513 |
| 4,410,158 A | * | 10/1983 | Maffei ............... | F16M 11/2014 248/214 |
| 4,638,969 A | * | 1/1987 | Brown ................... | F16M 11/10 248/920 |
| 4,836,478 A | * | 6/1989 | Sweere .................. | F16M 13/02 248/920 |
| 5,058,848 A | * | 10/1991 | Ferraro ................ | A47B 23/007 248/445 |
| 5,405,117 A | * | 4/1995 | Davis ..................... | F16M 11/42 248/323 |
| 5,630,566 A | * | 5/1997 | Case ...................... | F16M 11/42 248/122.1 |

(Continued)

*Primary Examiner* — Ingrid M Weinhold
(74) *Attorney, Agent, or Firm* — Cramer Patent & Design, PLLC.; Aaron R. Cramer

(57) ABSTRACT

A mobile overhead monitor bracket stand is a floor mounted video monitor stand. The stand is provided with a heavy base, complete with five (5) or more locking casters that allow it to easily roll around the floor. The base then provides a central shaft, adjustable in length, that extends upward. The top of the shaft is then provided with a rotating side arm complete with multiple adjustable angle joints that rotate one-hundred-eighty degrees (180°) as well as extend in length, that terminate in a standard VESA mounting bracket for a mounting almost any size of monitor within the weight limits of the invention. The monitor could be positioned in a vertical (standard) position, or be placed in an inverted, or upside down, manner over a user in an inclined chair. This will allow for comfortable and relaxed computer usage, social media viewing, or computer gaming. The device would also be provided with another VESA mounting bracket on the main central shaft for mounting of a second monitor for use in conventional desk-style viewing or for viewing by spectators in a competitive computer gaming environment. Certain models of the device would also be provided with an integral lighting system as well as enclosed wiring channels.

1 Claim, 4 Drawing Sheets

(56) References Cited

U.S. PATENT DOCUMENTS

| | | | | |
|---|---|---|---|---|
| 5,671,900 A * | 9/1997 | Cutler | B25H 1/00 | 248/448 |
| 5,738,316 A * | 4/1998 | Sweere | F16M 11/2092 | 248/920 |
| 5,918,841 A * | 7/1999 | Sweere | A47B 21/0314 | 248/281.11 |
| 5,979,857 A * | 11/1999 | Holm | A47B 23/046 | 248/441.1 |
| 6,012,591 A * | 1/2000 | Brandenberg | A47B 9/14 | 211/26 |
| 6,098,936 A | 8/2000 | Birrell | | |
| 6,129,319 A * | 10/2000 | Metelski | G02B 7/001 | 359/384 |
| 6,454,116 B1 * | 9/2002 | O'Neill | F16M 11/046 | 220/592.24 |
| 6,783,105 B2 | 8/2004 | Oddsen, Jr. | | |
| 6,796,536 B1 * | 9/2004 | Sevier, IV | A47B 23/046 | 248/924 |
| 7,040,591 B1 * | 5/2006 | Simon | A47B 23/04 | 248/458 |
| 7,118,080 B2 * | 10/2006 | Chan | F16M 11/105 | 248/161 |
| 7,134,719 B2 * | 11/2006 | Moglin | A47C 7/72 | 297/188.21 |
| 7,621,544 B2 * | 11/2009 | Rossini | F16M 11/22 | 280/47.35 |
| D618,009 S * | 6/2010 | Lancet | D6/700 | |
| 8,091,849 B2 * | 1/2012 | Ayadhi | F16M 11/2092 | 248/323 |
| 8,154,859 B2 * | 4/2012 | Shahrokhi | F16M 11/425 | 52/39 |
| 8,702,049 B2 * | 4/2014 | Vieira | F16M 11/041 | 248/245 |
| 8,794,579 B2 * | 8/2014 | Sturman | F16M 11/041 | 248/921 |
| 9,068,691 B2 * | 6/2015 | Abbanato | F16M 11/08 | |
| 9,247,861 B2 | 2/2016 | Kan et al. | | |
| 9,366,379 B2 * | 6/2016 | Bowman | F16M 11/045 | |
| 9,549,609 B2 * | 1/2017 | Constantino | A47B 21/02 | |
| 9,746,125 B2 * | 8/2017 | Bowman | F16M 11/125 | |
| 9,791,097 B2 * | 10/2017 | Bowman | F16M 11/28 | |
| 9,822,921 B2 | 11/2017 | Chen et al. | | |
| 9,848,756 B2 | 12/2017 | Kan et al. | | |
| 9,980,561 B1 * | 5/2018 | Constantino | F16M 11/08 | |
| 10,203,064 B2 * | 2/2019 | Glaser | F16M 11/046 | |
| 10,413,043 B2 * | 9/2019 | King | F16M 11/041 | |
| 10,531,734 B1 * | 1/2020 | Brauer | A47B 9/20 | |
| 10,619,789 B1 | 4/2020 | Copeland | | |
| 10,758,829 B2 | 9/2020 | Cragg | | |
| 10,935,179 B2 * | 3/2021 | Hung | F16M 11/2007 | |
| 11,248,736 B2 * | 2/2022 | Simon | F16M 11/041 | |
| 11,284,749 B2 * | 3/2022 | Cooper | A47K 3/004 | |
| 11,333,294 B2 | 5/2022 | Pavlov | | |
| 11,464,327 B2 * | 10/2022 | Smith | F16M 11/28 | |
| 11,559,138 B2 * | 1/2023 | Koch | F16M 11/18 | |
| 12,137,881 B2 * | 11/2024 | Saltzburg | F16M 11/40 | |
| 2002/0001471 A1 * | 1/2002 | Chapman | F16M 11/42 | 396/428 |
| 2002/0017595 A1 * | 2/2002 | Koyanagi | A47B 23/04 | 248/122.1 |
| 2004/0178312 A1 * | 9/2004 | Parsons | F21S 8/043 | 248/286.1 |
| 2005/0230590 A1 * | 10/2005 | Westbrook | F16M 11/425 | 248/327 |
| 2006/0113445 A1 * | 6/2006 | Parsons | F16M 11/04 | 348/825 |
| 2006/0113446 A1 * | 6/2006 | Parsons | F16M 13/02 | 248/286.1 |
| 2006/0158836 A1 * | 7/2006 | Phillips | A47C 7/723 | 361/679.22 |
| 2007/0095992 A1 * | 5/2007 | Dozier | F16M 11/2014 | 248/276.1 |
| 2007/0158522 A1 * | 7/2007 | Shahrokhi | F16G 13/16 | 248/429 |
| 2007/0170339 A1 * | 7/2007 | Cooper | A47K 3/001 | 248/447 |
| 2009/0140109 A1 * | 6/2009 | Watson | F16M 13/00 | 248/176.1 |
| 2010/0019548 A1 * | 1/2010 | Tajbakhsh | A47B 21/00 | 297/162 |
| 2010/0059640 A1 * | 3/2010 | Helgesen | F16M 11/10 | 248/205.1 |
| 2011/0058701 A1 * | 3/2011 | Fulks | F16M 11/42 | 381/361 |
| 2014/0070059 A1 * | 3/2014 | Vieira | A47B 97/00 | 248/122.1 |
| 2014/0092318 A1 * | 4/2014 | Carrillo | F16M 13/027 | 348/E5.128 |
| 2014/0110542 A1 * | 4/2014 | Abbanato | F16M 11/425 | 248/176.1 |
| 2015/0289652 A1 * | 10/2015 | Strahinic | A47B 21/0314 | 211/85.8 |
| 2015/0327765 A1 * | 11/2015 | Crane | A61B 5/489 | 348/77 |
| 2016/0281915 A1 * | 9/2016 | Bowman | F16M 11/045 | |
| 2016/0312950 A1 * | 10/2016 | Bowman | F16M 11/2092 | |
| 2017/0127544 A1 * | 5/2017 | Liu | G09F 7/20 | |
| 2020/0063896 A1 * | 2/2020 | Hung | F16M 11/046 | |
| 2021/0310603 A1 * | 10/2021 | Simon | F16M 11/42 | |
| 2022/0133032 A1 * | 5/2022 | Smith | A47B 23/025 | 248/445 |
| 2022/0397230 A1 * | 12/2022 | Tucker | F16M 11/18 | |
| 2023/0068344 A1 * | 3/2023 | Mukai | F16M 11/42 | |

* cited by examiner

MOBILE OVERHEAD MONITOR BRACKET STAND

RELATED APPLICATIONS

None.

FIELD OF THE INVENTION

The present invention relates generally to a bracket stand and more specifically to a bracket stand for a mobile overhead monitor.

BACKGROUND OF THE INVENTION

Computer based home video game systems are more popular than ever. Modern technological advancements in gaming systems have resulted in literally hundreds of games with unprecedented depth and detail. To further the realism of these games, the market has responded with a wealth of input devices such as joysticks, steering wheels, foot operated pedals and the like.

However, one component that is always standard and perhaps even considered a commodity is the viewing monitor. With the wide variety of gaming chairs and simulators now available, standard desktop monitors simply do not work. Even if such monitors are mounted on an articulating arm, they are limited in their positioning ability and require the presence of a vertical surface such as a wall for proper mounting. Accordingly, there exists a need for a means by which a video monitor can be supported in almost any position and without the need for a vertical mounting surface. The development of the mobile overhead monitor bracket stand fulfills this need.

SUMMARY OF THE INVENTION

To achieve the above and other objectives, the present invention provides for a portable rolling stand having a weighted base having a center, a central vertical post which has a lower post and an upper post, the central vertical post extends upward from the center of the weighted base, a vertical monitor mount which is mounted on the central vertical post using an extension arm and a post clamp, a secondary monitor attached to the vertical monitor mount, a plurality of power cabling and signal cabling routed to an inverted video monitor and the secondary monitor through a cable channel cover to provide a neat and organized appearance, a light fixture connected to the central vertical post via a conventional pole clamp and a plurality of rolling casters disposed underneath the weighted base.

The lower post and the upper post may be connected by an extension joint. The extension joint may allow a total height of the vertical post to vary along a vertical post travel path. The lower post, the upper post, the horizontal post, and the angle arm may each include the cable channel cover. A top of the central vertical post may be provided with a first swivel joint that connects with a horizontal post and a distal end of the horizontal post is provided with a second swivel joint.

The first swivel joint and the second swivel joint may allow movement along a swivel travel path. The second swivel joint may then support an angle arm. A lower surface of the angle arm may support an overhead monitor mount. The overhead monitor mount moves on the angle arm along a monitor travel path in a monitor mount track. The overhead monitor mount may be a standard Video Electronics Standards Association mount. The vertical monitor mount may be the standard Video Electronics Standards Association mount. The vertical monitor mount may be located at any point along the central vertical post. The inverted video monitor may be attached to the overhead monitor mount and is positioned in a downward facing position. The inverted video monitor may provide a viewing angle that covers all areas of the inverted video monitor without distortion. The cable channel cover may utilize a plurality of removable attachment means selected from the group consisting of a magnetic removable attachment means, a slot-and-pin removable attachment means, or an adhesive removable attachment means.

The removable attachment means may allow periodic replacement of the power cabling and signal cabling as needed. The light fixture may be a light-emitting diode studio light. The rolling casters may be at least five rolling casters. The rolling casters may be at least five lockable rolling casters. The rolling casters may be at least five rotating lockable rolling casters.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
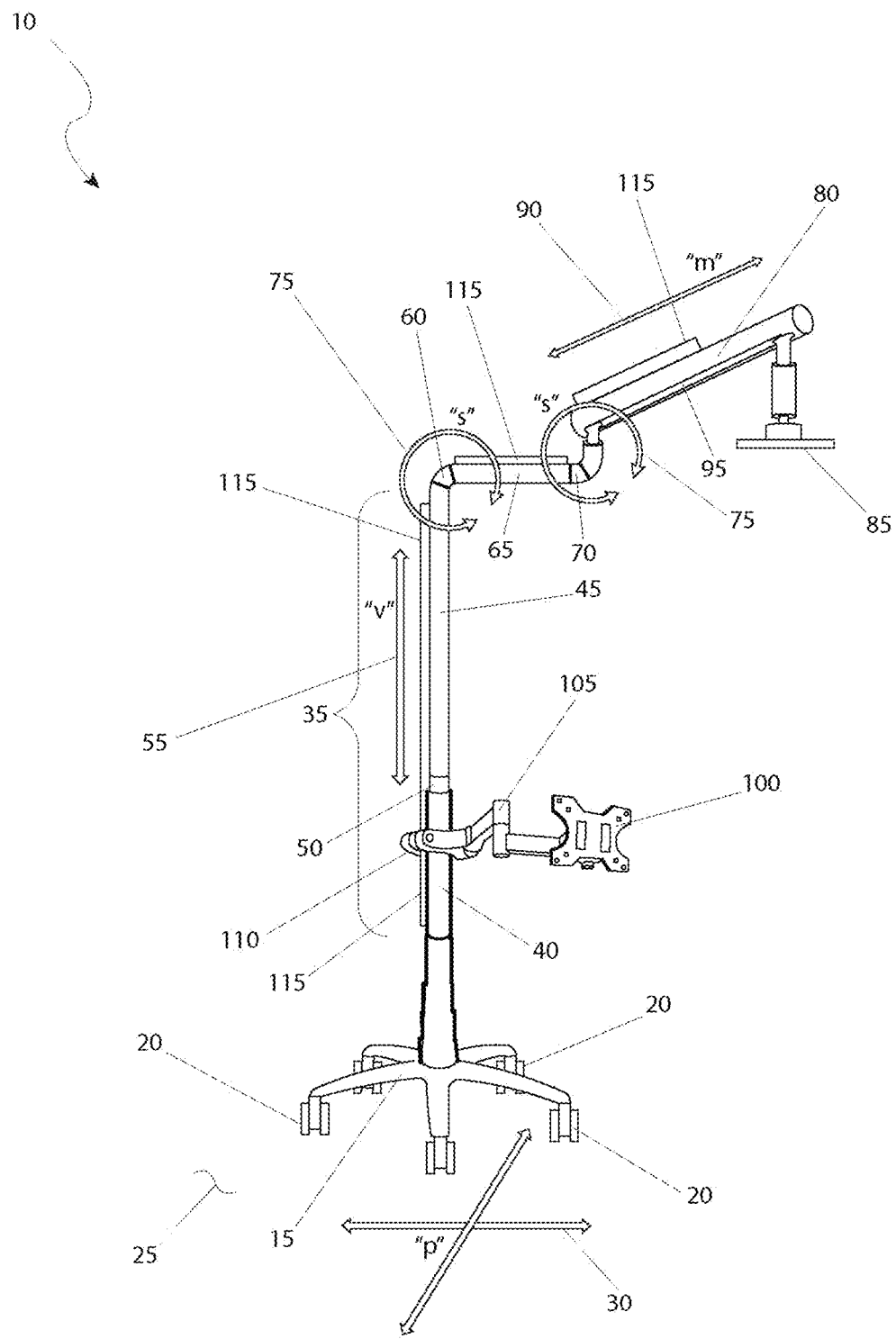
FIG. 1 is a front view of the portable rolling stand, according to the preferred embodiment of the present invention.

DESCRIPTIVE KEY 10 portable rolling stand
15 base
20 caster
25 floor surface
30 planar travel path "p"
35 vertical post
40 lower post
45 upper post
50 extension joint
55 vertical post travel path 'v'
60 first swivel joint
65 horizontal post
70 second swivel joint
75 swivel travel path "s"
80 angle arm
85 overhead monitor mount
90 monitor travel path "m"
95 monitor mount track
100 vertical monitor mount
105 extension arm
110 post clamp
115 cable channel cover
120 inverted video monitor
125 reclining chair 130 viewing angle
135 secondary monitor
140 power cabling
145 signal cabling
150 light fixture
155 removable attachment means

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the portable rolling stand 10, according to the preferred embodiment of the present invention is disclosed. The portable rolling stand (herein also described as the "stand") 10 is provided with a weighted base 15 and is equipped with at least five (5) or more three hundred sixty degree (360°) lockable rolling casters 20 allowing the stand 10 to move across a floor surface 25. The weighted base 15 is of sufficient weight to counteract any overturning or "top heaviness" of the stand 10 when in use. A central vertical post 35 extends upward from the center of the weighted base 15. The vertical post 35 comprises a lower post 40 and an upper post 45 connected by an extension joint 50. The extension joint 50 allows the total height of the vertical post 35 to vary along a vertical post travel path "v" 55. The top of the vertical post 35 is provided with a first swivel joint 60 that connects with a horizontal post 65. The distal end of the horizontal post 65 is provided with a second swivel joint 70. The first swivel joint 60 and the second swivel joint 70 allow movement along a swivel travel path "s" 75. The second swivel joint 70 then supports an angle arm 80.

The lower surface of the angle arm 80 supports an overhead monitor mount 85. The overhead monitor mount 85 moves on the angle arm 80 along a monitor travel path "m" 90 in a monitor mount track 95. A vertical monitor mount 100 is mounted on the vertical post 35 using an extension arm 105 and a post clamp 110. The vertical monitor mount 100 can be located at any point along the vertical post 35. The lower post 40, the upper post 45, the horizontal post 65, and the angle arm 80 are provided with cable channel covers 115, whose functionality will be described in greater detail herein below. Both the overhead monitor mount 85 and the vertical monitor mount 100 are envisioned to be standard Video Electronics Standards Association (VESA) mounts capable of accepting almost any type of video monitor.

Figure 2:
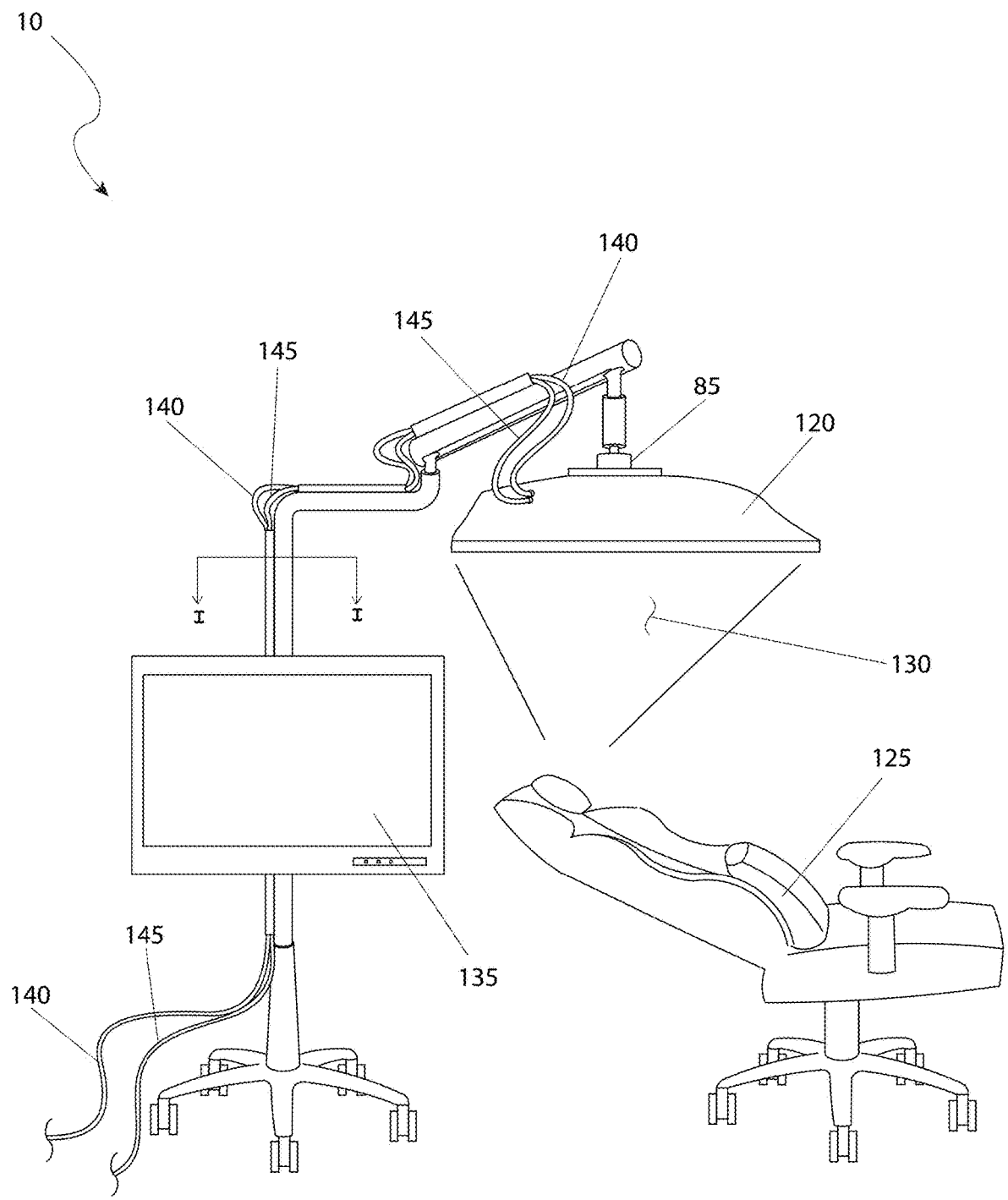
FIG. 2 is a front view of the portable rolling stand, shown in a utilized state, according to the preferred embodiment of the present invention.

Referring next to FIG. 2, a front view of the stand 10 shown in a utilized state, according to the preferred embodiment of the present invention is depicted. An inverted video monitor 120 is attached to the overhead monitor mount 85 and is positioned in a downward facing position. A user (not shown) can be seated in a reclining chair 125. The position is envisioned to be comfortable and relaxing. The position of the inverted video monitor 120 provides a viewing angle 130 that covers all areas of inverted video monitor 120 without distortion.

A secondary monitor 135 is attached to the vertical monitor mount 100 (not shown in this figure due to illustrative limitations). Power cabling 140 and signal cabling 145 are routed to the inverted video monitor 120 and the secondary monitor 135 as shown through the cable channel covers 115 to provide a neat and organized appearance. It is noted that FIG. 2 depicts both the inverted video monitor 120 and the secondary monitor 135 in use. However, it is noted that either one (1) or both the inverted video monitor 120 and the secondary monitor 135 can be used simultaneously or independently. It is envisioned that the inverted video monitor 120 that would be used by a user in the reclining chair 125 for purposes of computer gaming. However, other uses of the inverted video monitor 120 include computer usage, social media viewing, or business meetings. The secondary monitor 135 may be used in a conventional desk-style or wall-mount viewing or for viewing by spectators in a competitive computer gaming environment.

Figure 3:
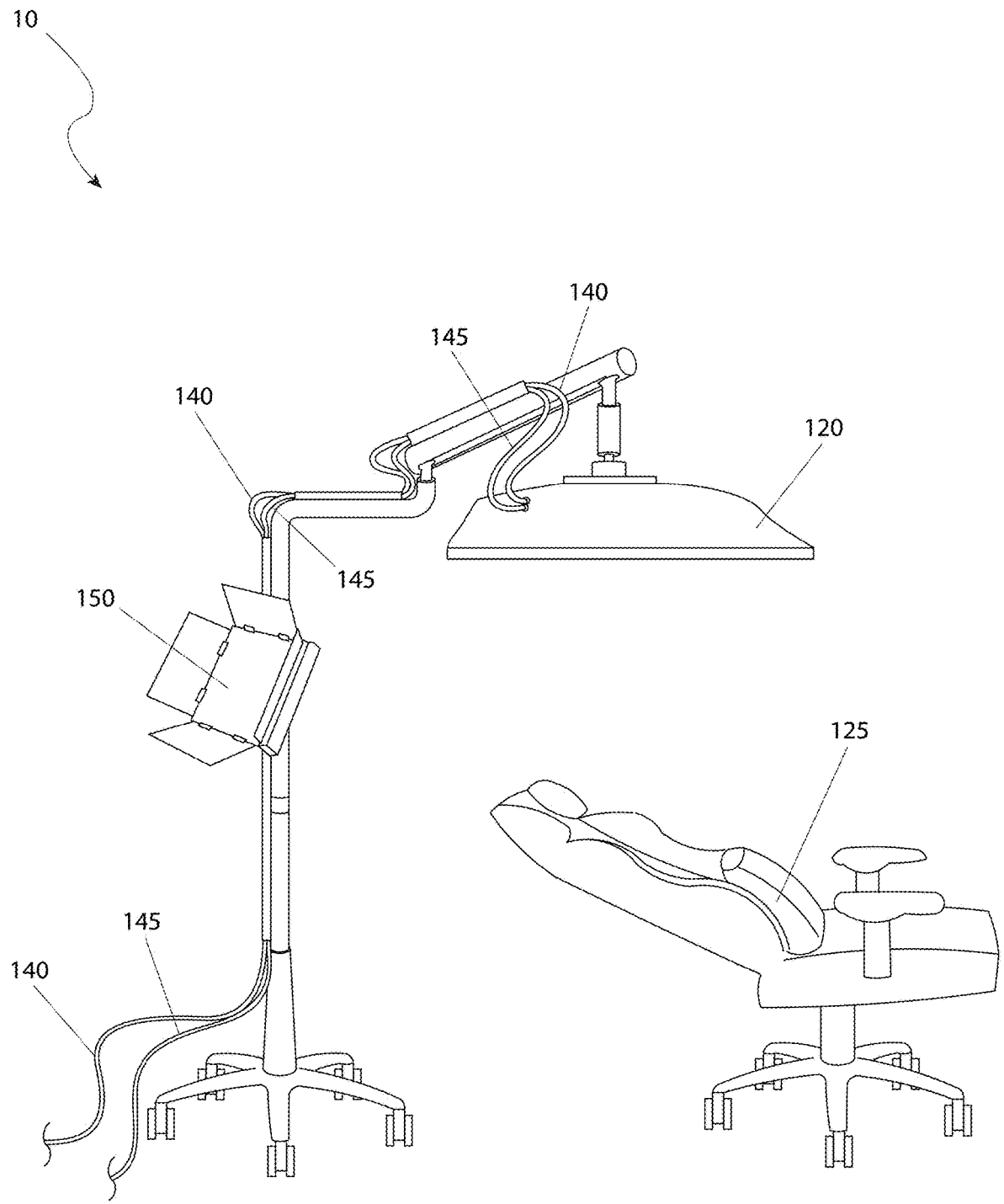
FIG. 3 is a front view of the portable rolling stand, shown in another utilized state, according to the preferred embodiment of the present invention.

Referring now to FIG. 3, a front view of the stand 10, shown in another utilized state, according to the preferred embodiment of the present invention is shown. The configuration depicted in FIG. 3 is similar to that of FIG. 2 with the inverted video monitor 120 positioned over the reclining chair 125 and the power cabling 140 and the signal cabling 145 routed in the cable channel covers 115. However, in addition to signal cabling 145 (as shown in FIG. 2), the present configuration provides for a light fixture 150 connected to the vertical post 35. The vertical post 35, herein depicted as a light-emitting diode (LED) studio light, is attached to the vertical post 35 via a conventional pole clamp (not shown due to illustrative limitations). It is noted that any type of pole-mounted lighting fixture may be used with the stand 10. The light fixture 150 is envisioned to be used for lighting used during virtual business meetings, social media, vlogging, or the like.

Figure 4:
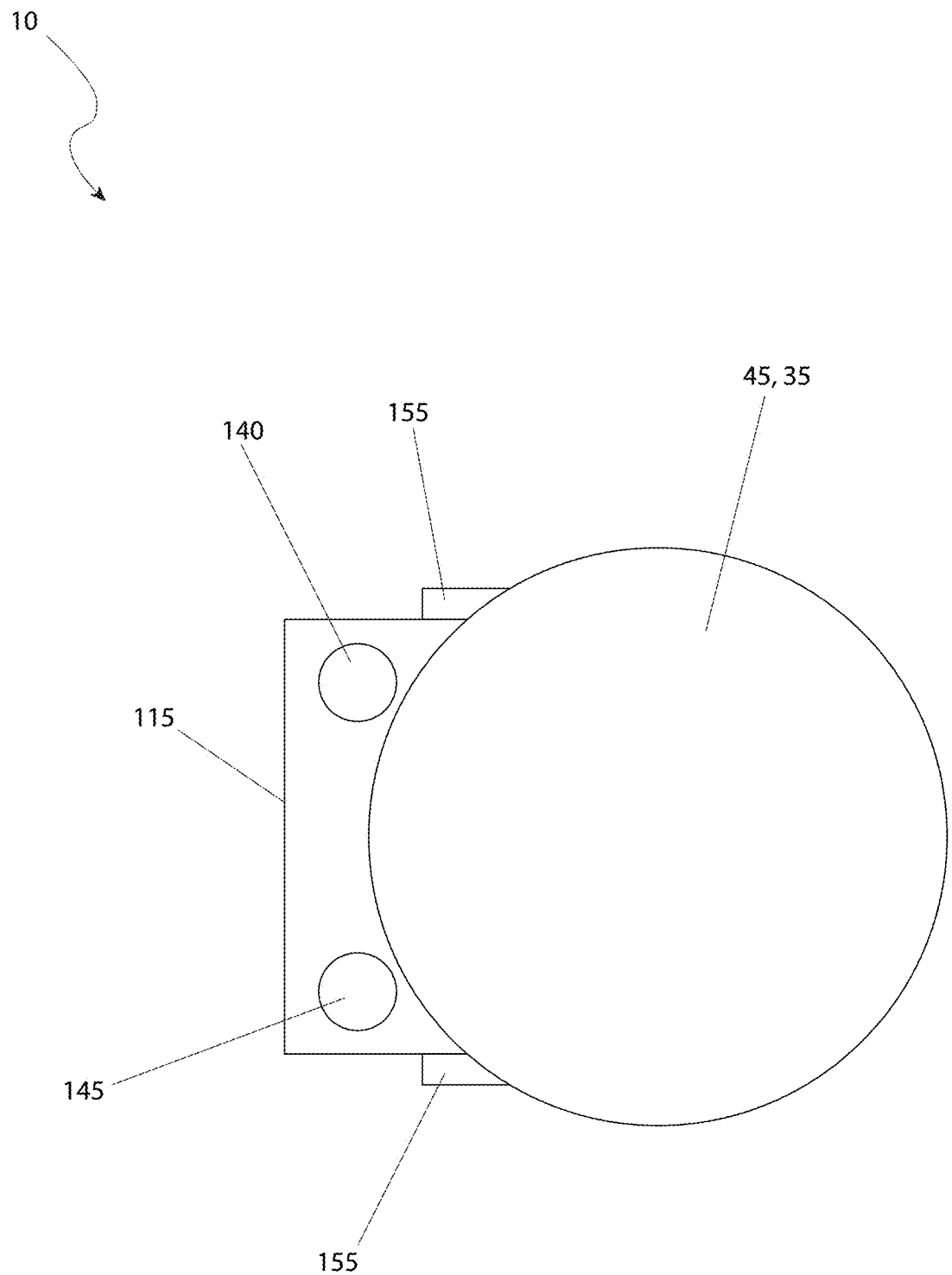
FIG. 4 is a sectional view of the portable rolling stand, as seen along a Line I-I, as shown in FIG. 2, according to the preferred embodiment of the present invention.

Referring finally to FIG. 4, a sectional view of the stand 10, as seen along a Line I-I, as shown in FIG. 2, according to the preferred embodiment of the present invention is disclosed. A cable channel cover 115 is tangentially attached to the upper post 45 of the vertical post 35. Cable channel covers 115 with a similar cross-section will be experienced with the lower post 40, the horizontal post 65, and/or the angle arm 80. The cable channel covers 115 utilize multiple removable attachment means 155 to provide physical attachment, which may be magnetic, slot-and-pin, adhesive, or the like. The exact method of removable attachment means 155 is not intended to be a limiting factor of the present invention. The removable nature of the cable channel covers 115, afforded by the removable attachment means 155, allows for periodic replacement of power cabling 140 or signal cabling 145 as needed.

2. Operation of the Preferred Embodiment

The preferred embodiment of the present invention can be utilized by the common user in a simple and effortless manner with little or no training. It is envisioned that the stand 10 would be constructed in general accordance with FIG. 1 through FIG. 4. The user would procure the stand 10 from conventional procurement channels such as electronics retailers, discount stores, department stores, office supply stores, mail order and internet supply houses and the like. Special attention would be paid to the overall size of the stand 10 and any specific accessories such as inverted video monitor 120, the secondary monitor 135 and/or the light fixture 150 to be used with the stand 10.

After procurement and prior to utilization, should an inverted video monitor 120 be desired, an attachment to the overhead monitor mount 85 would be made in a conventional manner. Should a secondary monitor 135 be desired, the vertical monitor mount 100 would be attached to the vertical post 35 using the extension arm 105 and the post clamp 110. Should a light fixture 150 be desired, an attachment would be made to the central vertical post 35 at the desired location. Any and all power cabling 140 and signal cabling 145 would be secured within the cable channel covers 115 using the removable attachment means 155. At this point in time the stand 10 is ready for use.

During utilization in the instance of the overhead monitor mount 85, the user would sit in a reclining chair 125 during use. Other observers, either standing or sitting, may view the secondary monitor 135. Auxiliary lighting may be provided by the light fixture 150. It is envisioned that the stand 10 would be used at video gaming competitions, for video game chairs, social media, game rooms, restaurants, clubs, and the like. Additionally, a disabled user and those with any back ailment may find the position afforded by the reclining chair 125, and the overhead monitor mount 85 more comfortable. During gaming competitions, audience members may view the secondary monitor 135 while the player utilizes the inverted video monitor 120 while seated in the reclining chair 125.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A portable rolling stand for supporting video monitors, consisting of:
 a weighted base configured to provide stability for the stand;
 a plurality of lockable rolling casters attached to the base, enabling the stand to be moved across a surface;
 a vertical post consisting of a lower post and an upper post connected by an extension joint configured to allow for height adjustment of the vertical post;
 a horizontal post attached to the vertical post by a first joint configured to enable repositioning of the horizontal post;
 an angle arm attached to the horizontal post by a second joint configured to allow repositioning of the angle arm relative to the horizontal post;
 an overhead monitor mount attached to the angle arm and a vertical monitor mount attached to the vertical post, wherein the overhead monitor mount and the vertical monitor mount are each configured to hold a display monitor; and,
 cable channel covers attached to at least the vertical post, horizontal post, and angle arm, wherein the cable channel covers are removably attached to enable periodic replacement of cabling routed through them.

\* \* \* \* \*